United States Patent [19]

Freidzon

[11] Patent Number: 5,936,020
[45] Date of Patent: Aug. 10, 1999

[54] HIGH SOLIDS VINYL ACETATE-ETHYLENE EMULSIONS

[75] Inventor: Yakov S. Freidzon, Durham, N.C.

[73] Assignee: Reichhold Chemicals, Inc., Durham, N.C.

[21] Appl. No.: 08/916,817

[22] Filed: Aug. 22, 1997

[51] Int. Cl.$^6$ ....................................................... C08K 5/06
[52] U.S. Cl. ........................... 524/377; 524/803; 524/812; 524/820; 524/823; 524/828; 524/833
[58] Field of Search ..................................... 524/377, 803, 524/804, 812, 819, 820, 821, 822, 823, 827, 828, 831, 832, 833

[56] References Cited

U.S. PATENT DOCUMENTS

| | | | |
|---|---|---|---|
| 3,692,723 | 9/1972 | Kasagi et al. | 260/29.6 E |
| 4,921,898 | 5/1990 | Lenny et al. | 524/459 |

FOREIGN PATENT DOCUMENTS

0373313 A2   6/1990   European Pat. Off. ...... C08F 218/08

OTHER PUBLICATIONS

Fernandez et al.; *New APE–Alternative Surfactant Systems for Emulsion Polymerization*, Waterbone, Higher–Solids, and Powder Coatings Symposium, Feb. 5–7, 1997, New Orleans, LA, pp. 182–191.

*Primary Examiner*—Edward J. Cain
*Attorney, Agent, or Firm*—Myers Bigel Sibley & Sajovec

[57] ABSTRACT

A vinyl acetate-ethylene copolymer emulsion having a solids content of at least about 65 percent by weight comprises about 5 to 40 percent by weight ethylene; about 60 to 95 percent by weight vinyl acetate; greater than about 3.0 percent by weight of a polyvinyl alcohol having a degree of polymerization of from about 100 to 500; about 1 to about 4 percent by weight of an ethyoxylated aliphatic surfactant having an HLB of from about 16.5 to 18.0; and about 0.2 to about 1.0 weight percent of a dispersant.

18 Claims, No Drawings

HIGH SOLIDS VINYL ACETATE-ETHYLENE EMULSIONS

FIELD OF THE INVENTION

The present invention relates to vinyl acetate-ethylene emulsions. More particularly, the invention relates to vinyl acetate-ethylene emulsions having a low viscosity at high solids content.

BACKGROUND OF THE INVENTION

Water-borne adhesives have experienced increased use relative to other materials such as solvent-borne and hot melt adhesives. More specifically, solvent-borne adhesives have become disfavored due to heightened environmental regulation. Hot melt adhesives are typically energy intensive and tend to possess relatively low heat resistance properties. Moreover, the performance characteristics of the solvent-borne and hot melt adhesives are often limited by the low molecular weight of the polymers employed.

Nonetheless, the end properties of water-borne adhesives are often adversely affected due primarily to the high water level of the adhesive polymer latexes. Specific disadvantages relate to grain raising on wood products, curling of paper products, and overall slow setting speed of the adhesive. Accordingly, recent efforts have focused on producing water-borne adhesives having increased solids content. This has been done in an attempt to enhance parameters relating to speed of adhesive set, water resistance, and adhesion to difficult-to-bond substrates. U.S. Pat. No. 5,434,216 to Mudge proposes vinyl acetate-based polymer emulsion formed of various monomers and having a solids content which may range between 40 and 50 weight percent.

U.S. Pat. No. 4,921,898 to Lenney et al. proposes a vinyl acetate-ethylene copolymer emulsion having a solids content between 65 and 70 weight percent and utilizing 2 to 4 weight percent of polyvinyl alcohol.

U.S. Pat. No. 5,070,134 to Oyamada et al. proposes a vinyl acetate ethylene copolymer emulsion having a solids content between 65 and 75 weight percent. Oyamada et al. employs a nonionic surface active agent having an HLB of from 16.5 to 17.5 per 100 parts by weight of the vinyl acetate unit.

U.S. Pat. No. 5,629,370 to Freidzon proposes a vinyl acetate ethylene copolymer emulsion having a solids content of at least 65 percent by weight. Freidzon employs a mixture of nonionic surfactants having an HLB of from 16.0 to 16.5.

In spite of any potential advantages, the above disclosed emulsions may be disadvantageous. The emulsions often display inferior rheological properties, and thus are may be difficult to process. Also, the emulsions may be unstable in that they tend to phase separate. As a result, the emulsions can present processing problems as well as possessing less than acceptable physical properties. Additionally, the emulsions may be raise potential environmental concerns.

SUMMARY OF THE INVENTION

It is therefore an object of the present invention to provide a vinyl acetate-ethylene copolymer emulsion which has improved rheological properties.

It is a further object of the present invention to provide a vinyl acetate-ethylene copolymer emulsion that possesses good stability properties.

To these ends and others, the present invention provides a vinyl acetate-ethylene copolymer emulsion having a solids content of at least about 65 percent by weight. The copolymer emulsion comprises about 5 to 40 percent by weight of ethylene; about 60 to 95 percent by weight of vinyl acetate; greater than about 3.0 percent by weight of a polyvinyl alcohol having a degree of polymerization of from about 100 to 500; from about 1 to about 4 percent by weight of a ethoxylated aliphatic surfactant having an HLB of from about 16.5 to about 18.0; and from about 0.2 to about 1.0 percent by weight of a dispersant. The copolymer emulsion also preferably has a viscosity ranging from about 1000 to about 4000 cps.

DETAILED DESCRIPTION OF THE PREFERRED EMBODIMENT

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

As summarized above, the present invention relates to a vinyl acetate-ethylene copolymer emulsion which has a solids content of at least about 65 percent, more preferably from about 65 to about 75 percent by weight. The copolymer emulsion is formed from about 5 to about 40 percent by weight of ethylene; about 60 to about 95 percent by weight of vinyl acetate; and greater than about 3.0 percent by weight of a polyvinyl alcohol having a degree of polymerization of from about 100 to about 500. For the purposes of the invention, the polyvinyl alcohol may include a fully hydrolyzed polyvinyl alcohol, a partially hydrolyzed polyvinyl alcohol, and mixtures thereof. The copolymer emulsion also includes from about 1 to about 4 percent by weight of an ethoxylated aliphatic surfactant having an HLB of from about 16.5 to about 18.0. The copolymer emulsion includes from about 0.2 to about 1.0 percent by weight of a dispersant. In particular, the copolymer emulsion has a viscosity of less than about 4000 cps, more preferably from about 1000 to about 3000 cps.

Any suitable ethylene and vinyl acetate monomers may be employed in forming the copolymer emulsion. In a preferred embodiment, the emulsion is formed from about 10 to 25 percent of ethylene and from about 75 to 90 weight percent of vinyl acetate.

In accordance with the present invention, the copolymer emulsion includes a polyvinyl alcohol. Preferably, a polyvinyl alcohol is used having a degree of polymerization ranging of from about 200 to about 400. A partially hydrolyzed polyvinyl alcohol is one which can be about 87 to 89 mole percent hydrolyzed. The polyvinyl alcohol is one which has a degree of polymerization ranging preferably from about 150 to 300. Suitable polyvinyl alcohols can be prepared by synthesis and saponification techniques well known to those skilled in the art. Preferably, the polyvinyl alcohol is used in an amount ranging from about 3 to about 6 percent based on the weight of monomers. More preferably, the polyvinyl alcohol is used in an amount ranging from about 4 to about 5 percent by weight.

In accordance with the invention, the copolymer emulsion includes an ethoxylated aliphatic surfactant having an HLB ranging from about 16.5 to about 18.0. More preferably, the ethoxylated aliphatic surfactant is a branched alkyl. The branched alkyl preferably is a $C_{10}$ to $C_{15}$ alkyl, and more preferably a $C_{12}$ to $C_{14}$ alkyl. Although Applicant does not wish to be bound to any one theory, it is believed that the presence of the ethoxylated aliphatic surfactant allows the copolymer emulsion to display improved rheological properties and improved stability. In terms of stability, the copolymer emulsion typically does not phase separate when subjected to a standard 60 minute centrifuge test conducted at 3300 rpm. Commercially preferred ethoxylated aliphatic surfactants are the ABEX® 2500 series of surfactants sold by Rhone-Poulenc of Cranberry, N.J.; and the TERGITOL® 15-S series of surfactants sold by Union Carbide of Danbury, Conn.

Other surfactants may be employed in the copolymer emulsion of the invention. As an example, nonionic surfactants such as ethoxylated alkyl phenols may be used in the emulsion copolymer. Preferably, an additional surfactant may be in used in an amount from about 0 to about 1.5 percent based on the weight of the monomers.

The copolymer emulsion also includes a dispersant. As known in the art, a dispersant is a component which is added to a suspension medium to promote uniform and maximum separation of colloidal-size particles. Various dispersants may be used in the copolymer emulsion. Preferably, the dispersant is a salt of a polymeric acid. Suitable salts include, for example, sodium, potassium, and ammonium salts. Exemplary polymeric acids include carboxylic acids such as, but not limited to, maleic acid, acrylic acid, or methacrylic acid. A preferred commercial dispersant is TAMOL® 731A made available from Rohm and Haas Co. located in Philadelphia, Pa.

In addition to the amounts recited herein, the dispersant may be used in an amount ranging from about 0.3 to about 0.7 percent based on the weight of the monomers.

The vinyl acetate-ethylene copolymers of the present invention may optionally include one or more additional monomers such as, but not limited to, aliphatic conjugated dienes, non-aromatic unsaturated mono- or dicarboxylic ester monomers, aromatic unsaturated monomers, nitrile monomers, and mixtures thereof.

Suitable aliphatic conjugated dienes are $C_4$ to $C_9$ dienes and include, for example, butadiene monomers such as 1,3-butadiene, 2-methyl-1,3-butadiene, 2 chloro-1, 3butadiene, and the like. Blends or copolymers of the diene monomers can also be used. The aliphatic conjugated diene may be used in an amount, based on total weight of the starting monomers, from about 0 to about 5 percent by weight.

Suitable non-aromatic unsaturated monocarboxylic ester monomers include acrylates and methacrylates. The acrylates and methacrylates may include functional groups such as amino groups, hydroxy groups, epoxy groups and the like. Exemplary acrylates and methacrylates include methyl acrylate, methyl methacrylate, ethyl acrylate, ethyl methacrylate, butyl acrylate, butyl methacrylate, 2-ethylhexyl acrylate, glycidyl acrylate, glycidyl methacrylate, hydroxyethyl acrylate, hydroxyethyl methacrylate, hydroxypropyl acrylate, hydroxypropyl methacrylate, isobutyl methacrylate, hydroxybutyl acrylate, hydroxybutyl methacrylate, 3-chloro-2-hydroxybutyl methacrylate, n-propyl methacrylate and the like. Exemplary amino-functional methacrylates include t-butylamino ethyl methacrylate and dimethylamino ethyl methacrylate. Suitable non-aromatic dicarboxylic ester monomers are alkyl and dialkyl fumarates, itaconates and maleates, with the alkyl group having one to eight carbons, with or without functional groups. Specific monomers include diethyl and dimethyl fumarates, itaconates and maleates. Other suitable non-aromatic dicarboxylic ester monomers include di(ethylene glycol) maleate, di(ethylene glycol) itaconate, bis(2-hydroxyethyl) maleate, 2-hydroxyethyl methyl fumarate, and the like. The non-aromatic unsaturated mono- or dicarboxylic ester monomer is used in an amount, based on total weight of the starting monomers, preferably from about 0 to about 5 percent by weight.

Suitable monomers based on the half ester of the unsaturated dicarboxylic acid monomer include mono esters of maleic acid or fumaric acid having the formula ROOC—CH═CH—COOH wherein R is a $C_1$ to $C_{12}$ alkyl group, for example monomethyl maleate, monobutyl maleate and monooctyl maleate. Half esters of itaconic acid having $C_1$ to $C_{12}$ alkyl groups such as monomethyl itaconate can also be used. Blends or copolymers of the unsaturated mono- or dicarboxylic acid monomers and of the half ester of the unsaturated dicarboxylic acid can also be used. The unsaturated mono- or dicarboxylic acid or monomer based on the half ester of the unsaturated dicarboxylic acid is used in an amount, based on the total weight of the starting monomers, from about 0 to about 5 percent by weight.

Suitable aromatic unsaturated monomers may be employed and include styrene and styrene derivatives such as alphamethylstyrene, p-methyl styrene, divinyl benzene, vinyltoluene, divinyl toluene, ethylstyrene, tert-butyl styrene, monochlorostyrene, dichlorostyrene, vinyl benzyl chloride, fluorostyrene, alkoxystyrenes (e.g., paramethoxystyrene) and the like. The aromatic unsaturated monomers may be employed in an amount, based on the total weight of the monomer, ranging from about 0 to about 5 percent by weight.

Unsaturated mono- or dicarboxylic acid monomers and derivatives thereof may also be employed and include acrylic acid, methacrylic acid, itaconic acid, fumaric acid, and maleic acid. Such monomers may be used in an amount based on the total weight of the monomers ranging from about 0 to about 5 percent by weight.

Unsaturated nitrogen-containing monomers may also be employed such as acrylonitrile, methacrylonitrile, acrylamide, methacrylamide, N-methylolacrylamide, alkylated N-methylolacrylamides such as N-methoxymethylacrylamide and N-butoxymethylacrylamide and acrolein. The nitrogen-containing monomers may be used in an amount, based on the total weight of the monomers, ranging from about 0 to about 5 percent by weight.

The copolymer emulsion can include additives to improve its various physical and mechanical properties, the selection of which is readily apparent to one skilled in the art. For example, any appropriate crosslinking agent may be used, along with monomers which promote solvent resistance, adhesion and strength.

Initiators are often employed to facilitate polymerization and can include, for example, materials such as persulfates, peroxides, peresters, and azo compounds such as azobis (isobutyronitrile) (AIBN). Peroxide initiators are preferred and include, for example, cumene hydroperoxide, 2,5-dimethylhexane-2,5-dihydroperoxide, dicumylperoxide, diisopropylbenzene hydroperoxide, tert butyl hydroperoxide, and the like. For the purposes of the invention, hydrogen peroxide is a preferred initiator. Preferably, the amount of initiator ranges from about 0.01 percent to 2 percent based on the weight of the total monomer. More preferably, the initiator ranges from about 0.1 percent to 1 percent.

Reductants may be employed in the polymerization, and are typically employed in combination with the initiator as part of a redox system. Suitable reductants include sodium bisulfite, erythorbic acid, ascorbic acid, sodium thiosulfate, sodium formaldehyde sulfoxylate (SFS), and the like. A preferred redox system includes hydrogen peroxide as an initiator and SFS.

Other additives which may be used include other natural and synthetic binders, fixing agents, wetting agents, plasticizers (e.g., diisodecyl phthalate), softeners, foam-inhibiting agents, froth aids, other crosslinking agents (e.g., melamine formaldehyde resin), flame retardants, pH adjusting components (e.g., acetic acid), sequestering or chelating agents (e.g., ethylene diaminetetraacetic acid (EDTA) and other components. The selection of any of these additives is readily apparent to one skilled in the art.

The emulsion polymerization of the invention may be carried out by any well known and suitable means, including batch and semi-continuous techniques. In general, the process of forming the vinyl acetate-ethylene copolymer emulsion includes initially charging a reaction vessel with vinyl acetate, water, surfactant, and polyvinyl alcohol, along with any other suitable components. The vessel is also typically pressurized with ethylene. The vessel is preferably heated and maintained to a temperature ranging from about 50° C. to about 80° C., with the ethylene pressure being at about 400 to about 900 psi. Preferably, the vessel is initially charged with at least about 20 percent of the total vinyl acetate, with the remainder being added at increments during the course of the polymerization. It should be emphasized that such incremental additions can be continuous or discontinuous with respect to quantity and time.

At the start of the polymerization, the reaction vessel may be agitated by any suitable means so as to dissolve the ethylene in the vinyl acetate and water. The pressurized ethylene source can be shut off from the reactor so that the ethylene pressure decays as the polymerization is carried out or the source can be kept open to maintain the ethylene pressure throughout the reaction.

The polymerization is typically initiated by introducing initial quantities of initiator, with the reductant typically being added with the initial charge. After the polymerization has begun, additional initiator and reductant may be added as required to continue the polymerization reaction. The reaction is generally continued until the residual vinyl acetate content is below about 1.0%. Advantageously, the time for the polymerization reaction to be carried out ranges from about 1 to about 3 hours, and more preferably less than about 2 hours. As known in the art, the reaction time will vary depending upon variables such as temperature, the types of monomers utilized, and the desired extent of polymerization.

The emulsion produced by the present invention possesses desirable end properties. The emulsion has a solids content of greater than about 65 weight percent, and more preferably between about 65 and 75 weight percent. The emulsion has a viscosity lower than about 4000 cps determined in accordance with known and appropriate procedure. The copolymer emulsion may also display improved rheological and stability properties. The copolymer emulsion also can pose fewer potential environmental risks since it may be biodegradable.

The emulsion of the present invention may be advantageously used in a number of adhesive compositions. The emulsion is particularly desirable in adhesives which are used in making laminates, and in adhesives which are used to bind polymeric materials (e.g., vinyl) to cellulosic substrates. In such applications, the adhesives display good stability under variable humidity conditions.

The present invention and its advantages over the prior art will be more fully understood and appreciated from the illustrative examples which follow. It is understood that the examples are for illustrative purposes only, and are not intended as being limited upon the scope of the invention. A person skilled in the applicable arts will appreciate from the examples that this invention can be embodied in many different forms other than is specifically disclosed.

EXAMPLE 1

38 g of AIRVOL® 205, 38 g of AIRVOL® 203 (made available from Air Products and Chemicals located in Allentown, Pa., 76 g of a 50 percent water solution of TAMOL® 731A (made available from Rohm and Haas Co. located in Philadelphia, Pa., and 4.75 g of sodium formaldehyde sulfoxylate were placed in a 1-gallon reactor containing 665 g of water. The above solution was purged with nitrogen. The agitator speed was set to 215 rpm. Next, 950 g of vinyl acetate (50 percent of the total amount) and 3.8 g of acrylic acid were added to the reactor. When the temperature reached 50° C., the ethylene pressure was set to 450 psi. After this pressure was reached, the reactor agitation was set to 900 rpm and the ethylene pressure to 660 psi. When the ethylene pressure reached 660 psi, 273 ml of 0.83 percent solution of hydrogen peroxide was added over 120 minutes. Ten minutes after the catalyst was added, a mixture containing 938 g of vinyl acetate monomer and 0.38 g of diallyl maleate (DAM) was added over 105 minutes.

The resulting emulsion had a viscosity of 2735 cps at 65.2 percent solids, a total grit below 100 ppm, and a residual VAM of 0.44 percent. The emulsion showed no separation after a 60 min standard centrifuge test, and also displayed good rheological properties.

EXAMPLE 2

A procedure similar to that set forth in Example 1 was followed except that 19 g of Airvol® 205 and 76 g of Airvol® 203 were used as a protective colloid. The resulting emulsion had a viscosity of 2860 cps at 65.6 weight percent solids. The emulsion showed no separation after a 60 min. standard centrifuge test and displayed good rheological characteristics.

EXAMPLE 3

A procedure similar to that set forth in Example 1 was followed except that 95 g of Airvol® 203 were used as a protective colloid. The resulting emulsion had a viscosity of 1940 cps at 65.5 weight percent solids. The emulsion showed no separation after a 60 min. standard centrifuge test and displayed good rheological characteristics.

EXAMPLE 4

A procedure similar to that set forth in Example 3 was followed except that 38 g of TERGITOL® 15-S-30 sold by Union Carbide of Danbury, Conn. was used as a surfactant. The resulting emulsion had a viscosity of 2350 cps at 65.1 weight percent solids. The emulsion showed a very slight separation after a 60 min. standard centrifuge test and displayed good rheological properties.

EXAMPLE 5

A procedure similar to that set forth in Example 3 was followed except that 76 g of Airvol® 203 was used as a protective colloid. The resulting emulsion had a viscosity of 1380 cps at 67.2 weight percent solids. The emulsion showed a very slight separation after a 60 min. standard centrifuge test and displayed good rheological properties.

EXAMPLE 6

A procedure similar to that set forth in Example 5 was followed except that 38 g of ABEX® 2525 and 27.14 g of Igepal® CO-887 was used as surfactant. The resulting emulsion had a viscosity of 2300 cps at 66.0 weight percent solids. The emulsion showed a very slight separation after a 60 min. standard centrifuge test and displayed good rheological properties.

EXAMPLE 7

A procedure similar to that set forth in Example 1 was followed except that 38 g of partially hydrolyzed Airvol® 203 and 38 g of fully hydrolyzed Airvol® 103 were used as protective colloid. The resulting emulsion had a viscosity of 1080 cps at 66.3 weight percent solids. The emulsion showed a very slight separation after a 60 min. standard centrifuge test and displayed good rheological properties.

That which is claimed:

1. A vinyl acetate-ethylene copolymer emulsion having a solids content of at least about 65 percent by weight, said copolymer emulsion comprising:
   about 5 to 40 percent by weight ethylene;
   about 60 to 95 percent by weight vinyl acetate;
   greater than about 3.0 percent by weight of a polyvinyl alcohol having a degree of polymerization of from about 100 to 500, wherein said polyvinyl alcohol may be selected from the group consisting of a fully hydrolyzed polyvinyl alcohol, a partially hydrolyzed polyvinyl alcohol, and mixtures thereof;
   about 1 to about 4 percent by weight of an ethoxylated aliphatic surfactant having an HLB of from about 16.5 to 18.0; and
   about 0.2 to about 1.0 percent by weight of a dispersant, wherein said dispersant is a salt of a polymeric acid.

2. The copolymer emulsion according to claim 1, wherein said ethoxylated alipahtic surfactant is a branched alkyl.

3. The copolymer emulsion according to claim 1, wherein said copolymer emulsion has a solids content ranging from about 65 to about 75 weight percent.

4. The copolymer emulsion according to claim 1, wherein said copolymer emulsion comprises from about 4 to about 5 percent by weight of said polyvinyl alcohol.

5. The copolymer emulsion according to claim 1, wherein said copolymer emulsion does not phase separate subsequent to a 60 minute centrifuge test.

6. The copolymer emulsion according to claim 1, wherein said copolymer emulsion further comprises a monomer selected from the group consisting of an aliphatic conjugated diene, a non-aromatic unsaturated mono- or dicarboxylic ester monomer, a nitrile, monomer, and mixtures thereof.

7. A vinyl acetate-ethylene copolymer emulsion having a solids content of at least about 65 percent by weight, said copolymer comprising:
   about 5 to 40 percent by weight ethylene;
   about 60 to 95 percent by weight vinyl acetate;
   greater than about 3.0 percent by weight of a polyvinyl alcohol having a degree of polymerization of from about 100 to 500, wherein said polyvinyl alcohol is selected from the group consisting of a fully hydrolyzed polyvinyl alcohol, a partially hydrolyzed polyvinyl alcohol, and mixtures thereof;
   about 1 to about 4 percent by weight of an ethyoxylated aliphatic surfactant having an HLB of from about 16.5 to 18.0; and
   about 0.3 to about 0.7 weight percent of a dispersant which is a salt of a polymeric acid;
   wherein said copolymer emulsion has a viscosity ranging from about 1000 to about 3000 cps.

8. The copolymer emulsion according to claim 7, wherein said ethoxylated alipahtic surfactant is a branched alkyl.

9. The copolymer emulsion according to claim 7, wherein said copolymer emulsion has a solids content ranging from about 65 to about 75 weight percent.

10. The copolymer emulsion according to claim 7, wherein said copolymer emulsion comprises from about 4 to about 5 percent by weight of said polyvinyl alcohol.

11. The copolymer emulsion according to claim 7, wherein said copolymer emulsion does not phase separate subsequent to a 60 minute centrifuge test.

12. The copolymer emulsion according to claim 7, wherein said copolymer emulsion further comprises a monomer selected from the group consisting of an aliphatic conjugated diene, a non-aromatic unsaturated mono- or dicarboxylic ester monomer, a nitrile, monomer, and mixtures thereof.

13. An adhesive composition comprising a vinyl acetate-ethylene copolymer emulsion having a solids content of at least about 65 percent by weight, the copolymer emulsion comprising about 5 to 40 percent by weight ethylene; about 60 to 95 percent by weight vinyl acetate; greater than about 3.0 percent by weight of a polyvinyl alcohol having a degree of polymerization of from about 100 to 500, said polyvinyl alcohol selected from the group consisting of a fully hydrolyzed polyvinyl alcohol, a partially hydrolyzed polyvinyl alcohol, and mixtures thereof; about 1 to about 4 percent by weight of an ethoxylated aliphatic surfactant having an HLB of from about 16.5 to 18.0; and about 0.2 to about 1.0 percent by weight of a dispersant, wherein said dispersant is a salt of polymeric acid.

14. The adhesive composition according to claim 13, wherein said ethoxylated alipahtic surfactant is a branched alkyl.

15. The adhesive composition according to claim 13, wherein said copolymer emulsion has a solids content ranging from about 65 to about 75 weight percent.

16. The adhesive composition according to claim 13, wherein said copolymer emulsion comprises from about 4 to about 5 percent by weight of said polyvinyl alcohol.

17. The adhesive composition according to claim 13, wherein said copolymer emulsion does not phase separate subsequent to a 60 minute centrifuge test.

18. The adhesive composition according to claim 13, wherein said copolymer emulsion further comprises a monomer selected from the group consisting of an aliphatic conjugated diene, a non-aromatic unsaturated mono- or dicarboxylic ester monomer, a nitrile, monomer, and mixtures thereof.

* * * * *